United States Patent
Caggioni et al.

(10) Patent No.: US 8,125,979 B2
(45) Date of Patent: Feb. 28, 2012

(54) MULTI-CHANNEL OPTICAL TRANSPORT NETWORK TRAINING SIGNAL WRAPPER

(75) Inventors: Francesco Caggioni, Winchester, MA (US); Omer Acikel, San Diego, CA (US); Keith Conroy, Perkasie, PA (US)

(73) Assignee: Applied Micro Circuits Corporation, San Diego, CA (US)

( * ) Notice: Subject to any disclaimer, the term of this patent is extended or adjusted under 35 U.S.C. 154(b) by 270 days.

(21) Appl. No.: 12/169,518

(22) Filed: Jul. 8, 2008

(65) Prior Publication Data

US 2010/0008678 A1 Jan. 14, 2010

(51) Int. Cl.
*H04L 12/28* (2006.01)

(52) U.S. Cl. ........................................ 370/351

(58) Field of Classification Search .......... 370/351, 370/203, 229–236, 241–258, 395.1–395.5, 370/431–443, 464–479, 503–520, 537–540
See application file for complete search history.

(56) References Cited

U.S. PATENT DOCUMENTS

| | | | | |
|---|---|---|---|---|
| 7,065,374 B2 * | 6/2006 | Lipp et al. | | 455/502 |
| 7,289,530 B1 * | 10/2007 | Yuan et al. | | 370/465 |
| 7,362,779 B1 * | 4/2008 | Zabezhinsky | | 370/512 |
| 7,602,814 B2 * | 10/2009 | Meagher et al. | | 370/505 |
| 2003/0179779 A1 * | 9/2003 | Kim | | 370/503 |
| 2003/0180041 A1 * | 9/2003 | Azadet | | 398/25 |
| 2003/0223401 A1 * | 12/2003 | Lautenschlager et al. | | 370/351 |
| 2004/0062211 A1 * | 4/2004 | Uhlik | | 370/278 |
| 2004/0085917 A1 * | 5/2004 | Fitton et al. | | 370/292 |
| 2004/0156325 A1 * | 8/2004 | Perkins et al. | | 370/299 |
| 2005/0041986 A1 * | 2/2005 | Bulow | | 398/208 |
| 2007/0076767 A1 * | 4/2007 | Loprieno et al. | | 370/539 |
| 2007/0092260 A1 * | 4/2007 | Bontu et al. | | 398/152 |
| 2009/0196602 A1 * | 8/2009 | Saunders et al. | | 398/26 |

\* cited by examiner

*Primary Examiner* — Kwang B Yao
*Assistant Examiner* — Jung-Jen Liu
(74) *Attorney, Agent, or Firm* — Law Office of Gerald Maliszewski; Gerald Maliszewski

(57) ABSTRACT

Systems and methods are provided for multi-channel ITU G.709 optical transport network (OTN) transmission and receiving. The transmission method accepts a canonical ITU G.709 OTN frame including an OTU overhead (OH) section, an ODU section, and a forward error correction (FEC) parity section. A training signal wrapper is added to the ITU G.709 OTN frame, and at least a portion of a training-enhanced (TE) OTN frame is buffered in a tangible memory medium in preparation for striping. The method stripes the training-enhanced OTN frame into n parallel streams to supply n TE_OTN-PFs (Parallel Frames) at an output.

26 Claims, 6 Drawing Sheets

1/8 OTN FRAME

1/4 OTN FRAME

1/2 OTN FRAME

OTN FRAME

TSW 200 | FRAMING PATTERN 202 | TRAINING PATTERN 20F | CHANNEL ID 206

Fig. 5 *(PRIOR ART)*

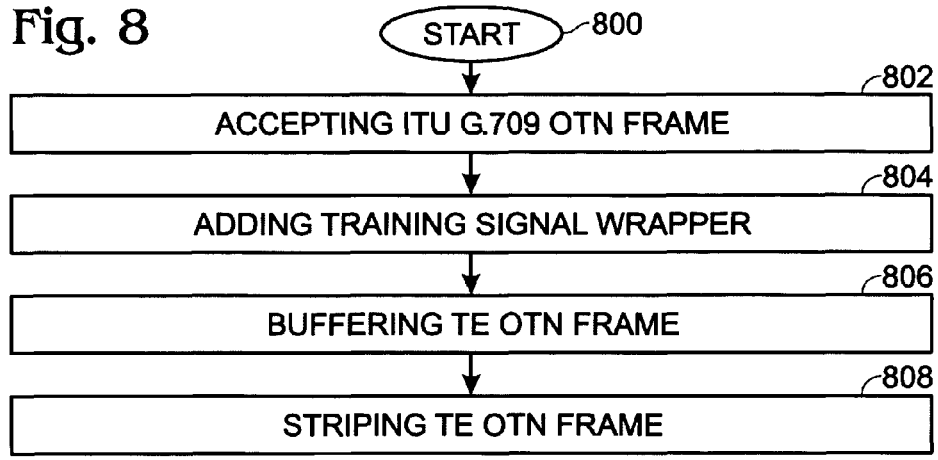
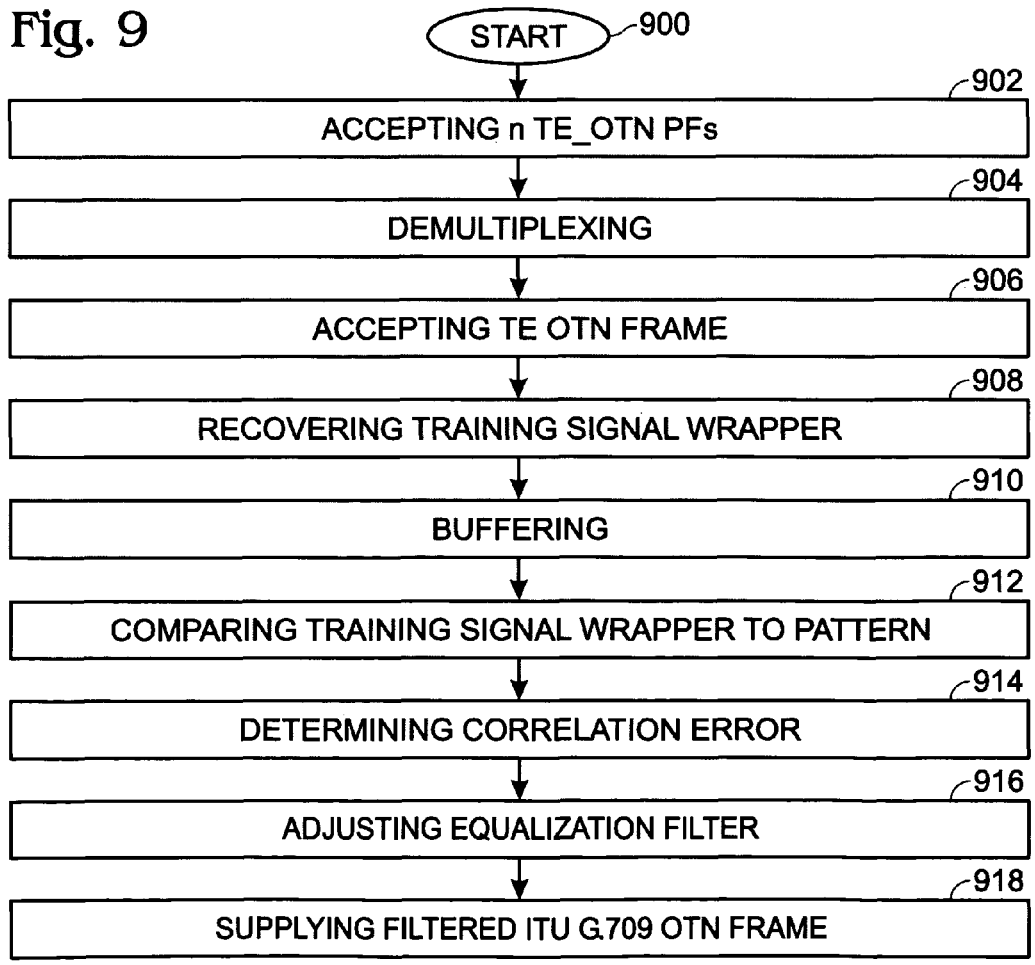

MULTI-CHANNEL OPTICAL TRANSPORT NETWORK TRAINING SIGNAL WRAPPER

BACKGROUND OF THE INVENTION

1. Field of the Invention

This invention generally relates to signal communications and, more particularly, to a training signal for use in a multi-channel Optical Transport Network (OTN) protocol.

2. Description of the Related Art

Signals may be communicated over parallel media using an inverse multiplexing scheme to concatenate channels. Conventionally, a virtual concatenation (VCAT) protocol uses an inverse multiplexing technique to split a signal into a payload of multiple Synchronized Optical Networking (SONET)/synchronous digital Hierarch (SDH) signals, which may be transmitted over independent routes. SONET/SDH protocols have been optimized for the transport of voice channels. VCAT uses multiple SONET/SDH containers to carry streams of data that would otherwise not fit in standard SONET/SDH containers, and is specified in ITU-T Recommendations G.707 (2007) and G.783 (2006).

The bandwidth is split equally among a set number of sub paths called Virtual Tributaries (VT). Several Virtual Tributaries form part of a Virtual Concatenation Group (VCG). The spawning of Virtual Tributaries to transport data across a VCAT-enabled network permits alternate paths to be used, which can be useful in congested networks. The Virtual Concatenation protocol uses byte-interleaving. For example, a Gigabit Ethernet (n, 1 Gb/s) may be distributed across (i) STS-nc VT's, where each VCG member carries a bandwidth equivalent of V=n/k [bits/second], n=1 Gb, and k=i. VCAT can also be used to concatenate multiple OTN channels using the same mechanism defined for SONET/SDH.

VCAT of multiple OTN channels may be used for transport of client signals with data rate of 100 Gbps, but this requires the monitoring of multiple channels and the use of additional bandwidth for the redundant overhead. The VCAT mechanism is suitable for use in physically parallel channels (e.g., different fiber). However, additional buffers are required for overcoming the skew (differential delay) between the different media.

100 gigabit per second (Gbps) OTN protocols are being developed where the OTN streams are carried in a "parallel fashion" at a bit-rate greater than 100 Gbps. Until recently, optical signals have been carried using 1 bit per symbol modulation techniques. However, the need for faster signal speeds means that return-to-zero (RZ), non-return-to-zero (NRZ), and phase-shift keying (PSK) modulations techniques (1 bit per symbol) are no longer suitable.

A proposed solution for the transmission of high speed signals (40/100 Gbps and above) uses a combination of multiplexed orthogonal optical polarization and 2 bits per symbol modulation techniques on each of the two polarizations. This multiplexing and modulation scheme, polarization multiplexing (PM)-QPSK, is a combination of serial and parallel communication. The communication is not exactly serial because the two polarizations are not completely synchronized, but it is not exactly parallel because the physical medium and lambda are the same. However, OTN signals were originally defined for use in serial transmissions. That is, OTN signals do not have characteristics inherent for efficient transmission and reception over "semi-parallel" channels. Since the semi-parallel channels may experience skew (differential delay), the recovery of a serial stream from parallel streams will require new techniques. While VCAT could potentially be used to solve this problem, a solution based on virtual concatenations would require a higher overall rate for the optical transmission, and multiple entities to be monitored.

It would be advantageous if a technique could be developed for more simply addressing the recovery of the OTN serial stream for high speed (40/100 Gbps and above) parallel stream networks.

SUMMARY OF THE INVENTION

The present invention presents a system and method for transmitting and receiving a training-enhanced (TE) OTN frame to be used in the context of transmitting and receiving high speed serial OTN signals.

Accordingly, a multi-channel ITU G.709 optical transport network (OTN) transmission method is provided. The method accepts a canonical ITU G.709 OTN frame including an OTU overhead (OH) section, an ODU section, and a forward error correction (FEC) parity section. A training signal wrapper is added to the ITU G.709 OTN frame, and at least a portion of a training-enhanced (TE) OTN frame is buffered in a tangible memory medium in preparation for striping. The method stripes the training-enhanced OTN frame into n parallel streams to supply n TE_OTN-PFs (Parallel Frames) at an output.

In one aspect, the ITU G.709 OTN frame is accepted at a rate of Xn bits/second, where X is the number of bits in the ITU G.709 OTN frame, and the TE OTN frame is supplied at a rate of (N+T)n bits/second, where T is the number of bits in the training signal wrapper. The training signal wrapper can be added to the ITU G.709 OTN frame in one of the following intervals: every ⅛ ITU G.709 OTN frame, every ¼ ITU G.709 OTN frame, every ½ ITU G.709 OTN frame, or once every ITU G.709 OTN frame.

The training signal wrapper may include the components of framing information, tone information, channel identification information, or combinations of the above-mentioned information types.

A multi-channel ITU G.709 OTN receiving method is also provided. The method accepts n TE_OTN-PFs, and demultiplexes the n parallel streams in the TE OTN frame. A training signal wrapper is recovered from the TE OTN, and at least a portion of an ITU G.709 OTN frame, including an OTU OH section, an ODU section, and a FEC parity section is buffered in a tangible memory medium.

The training signal wrapper may be compared with a predetermined pattern to determine the receiver correlation error. An equalization filter may be adjusted in response to determining the receiver correlation error, and a filtered ITU G.709 OTN frame is supplied.

Additional details of the above-described methods, as well as multi-channel ITU G.709 OTN transmitters and receivers are described below.

BRIEF DESCRIPTION OF THE DRAWINGS

FIG. 8 is a flowchart illustrating a multi-channel ITU G.709 OTN transmission method.

FIG. 9 is a flowchart illustrating a multi-channel ITU G.709 OTN receiving method.

DETAILED DESCRIPTION

Figure 1:
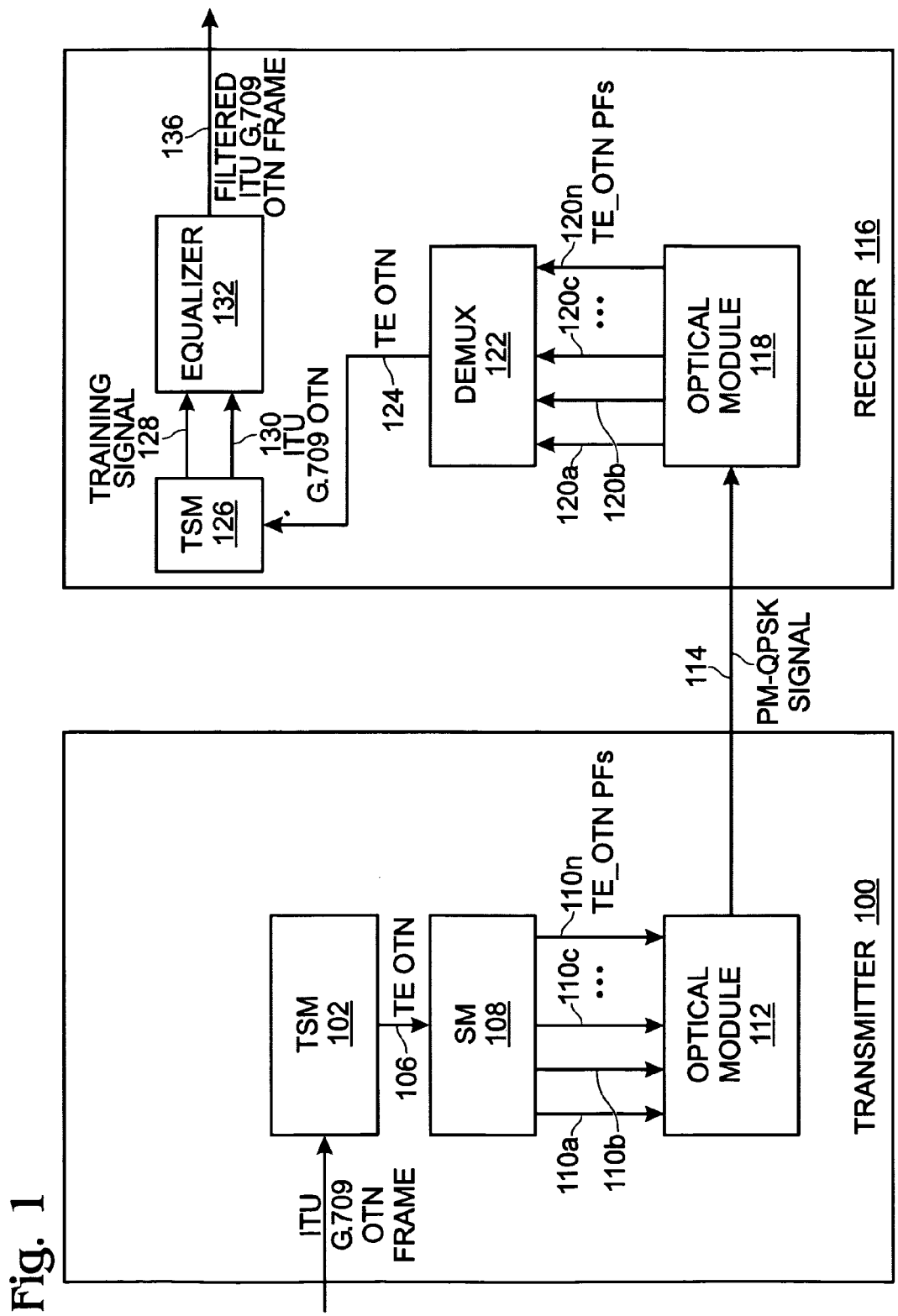
FIG. 1 is a schematic block diagram of a multi-channel ITU G.709 optical transport network (OTN) transmitter and receiver.

FIG. 1 is a schematic block diagram of a multi-channel ITU G.709 optical transport network (OTN) transmitter and receiver. Transmitter 100 may be part of a transceiver (not shown) that also includes a local receiver (not shown). A training signal module (TSM) 102 has an input on line 104 to accept an ITU G.709 OTN frame including an OTU overhead (OH) section, an ODU payload section, and a forward error correction (FEC) parity section. The training signal module 102 adds a training signal wrapper to the ITU G.709 OTN frame, and supplies a training-enhanced (TE) OTN frame at an output on line 106.

If the training signal module 102 accepts the ITU G.709 OTN frame at a rate of Xn bits/second, where X is the number of bits in the ITU G.709 OTN frame, then the TSM supplies a TE OTN frame on line 106 at a rate of (X+T)n bits/second, where T is the number of bits in the training signal wrapper. In one aspect, the TSM 102 supplies a TE OTN frame at a rate of (X+T*j)n bits/second, where T is the number of bits in the training signal wrapper and j is 2, 4, or 8. However, the transmitter is not necessarily limited to any particular value of j.

A striping module (SM) 108 has an input on line 106 to accept the training enhanced OTN frame. The SM 108 stripes or interleaves the training-enhanced OTN frame into n parallel streams to supply n TE_OTN-PFs (Parallel Frames) at an output on line 110. In this example, n=4. However, the transmitter is not limited to any particular value of n. The SM 108 stripes the TE OTN into n parallel streams using either a bit or multi-bit orientation. For example, the SM 108 may interleave the TE OTN into parallel streams using multi-bit segments of a byte.

An optical module 112 accepts one pair of TE_OTN PF signals (e.g., signal paths 110a and 110b) as Ix and Qx electrical signal paths representing the two (I and Q) components of a quadrature phase shift keying (QPSK) modulated signal. Optical module 112 accepts another pair of TE_OTN PF signals (e.g., signal paths 110c and 110n) as Iy and Qy electrical signal representing two (I and Q) components of a QPSK modulated signal. The optical module 112 converts the four signals into a PM-QPSK signal transmitted on line 114. Note: although 4 parallel signal paths are shown for simplicity, the system may include a larger or smaller number of signal paths in other aspects not shown. Likewise, although the system is described in the context of QPSK modulation, the system is not necessary limited to any particular order of modulation or modulation format.

Figure 2A:
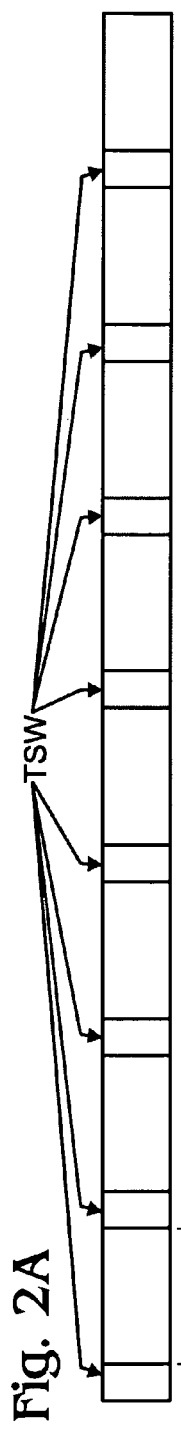
FIGS. 2A though 2D are schematic diagrams depicting exemplary TE OTN frames.
Figure 2B:
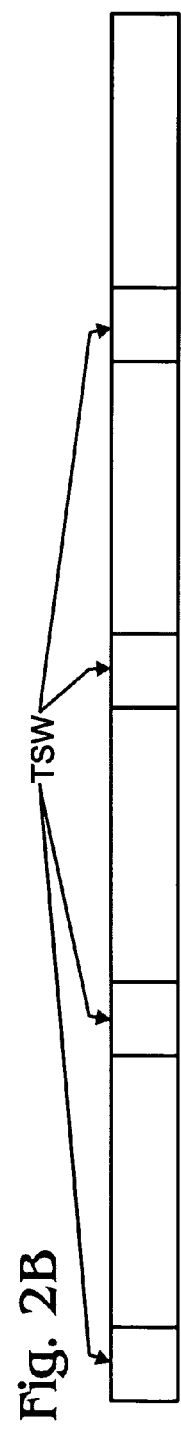
Figure 2C:
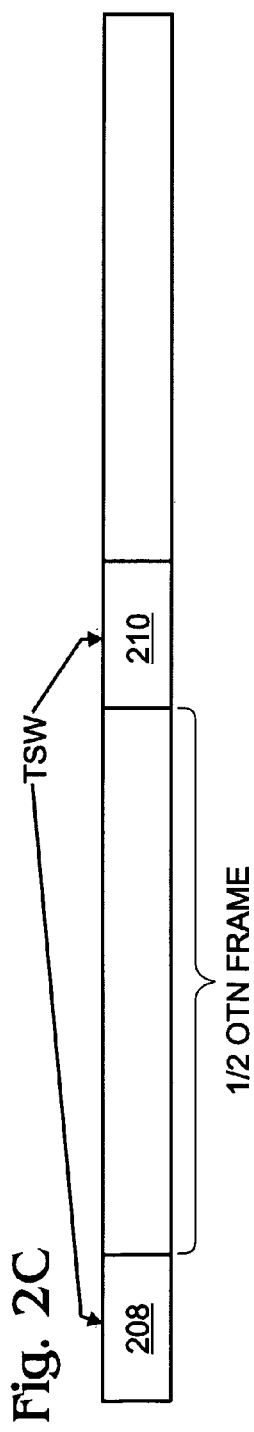

FIGS. 2A though 2D are schematic diagrams depicting exemplary TE OTN frames. The TSM 102 is capable of adding the training signal wrapper (TSW) to the TE OTN frames in a number of different intervals defined with respect to the ITU G.709 OTN frame. In FIG. 2A, the interval is one training signal wrapper every ⅛ ITU G.709 OTN frame. In FIG. 2B, the interval is every ¼ ITU G.709 OTN frame. In FIG. 2C, the interval is every ½ ITU G.709 OTN frame, and in FIG. 2D the interval is once every ITU G.709 OTN frame.

Figure 2D:
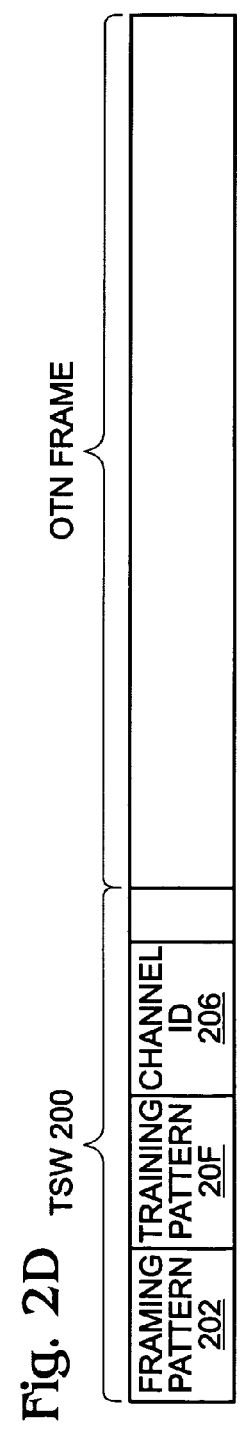

In addition to a predetermined patterns, the training signal module may supply a training signal wrapper with additional information, as shown in FIG. 2D. Further, the predetermined information may be broken into framing information and tone information. Channel identification information is an example of non-predetermined information that might be included in the training signal wrapper. As shown, the training signal wrapper may include combinations of the above-mentioned information types. The information section of the training signal wrapper shown in FIG. 2D includes all the above-mentioned information types. However, wrapper need not necessarily include all these types of information. Further, the information sent is not necessarily limited to just these information types. In addition, the information sections shown in FIG. 2D need not be located in any particular location inside the training signal wrapper.

Framing information is a signal easily identifiable such as 0xF6 0xF6 0xF6 0x28 0x28 0x28 that is used to recognize periodic frame structures.

Tone information is a series of deterministic bits values that are created to identify ISI (Inter-Symbolic Interference) and other characteristics of the channel. Examples include: 0b0000 0000 1000 0000 followed by 0b0000 0000 1100 0000, 0b0000 0000 1110 0000, 0b0000 0000 1111 0000. A sequence like this can be used to identity how a 0 will look like when it is preceded by a single "1", two "1"s, three "1"s, etc.

Channel ID is information is meant to identify channels. That is, which signal represents Ix, which signal represents Qx, which signal represents Iy, and which signal represents Qy. Examples of channel IDs might be: 0b1100, 0b1001, 0b0110 and 0b0011. Four bits might be used to minimize wander in the phase-locked loop (PLL) and any hamming distance between the symbols.

In one aspect, the training signal module adds a training signal wrapper 200 with a size in the range of 1 to 256 bytes for each TE OTN (see FIG. 2D). The framing pattern (framing information) 202 may have a size in the range of 0 to 256 bytes. The training pattern (tone information) 204 may have a size in the range of 0 to 256 bytes, and a channel ID 206 may have a size in the range of 0 to 256 bytes. However, the training signal and its components are not necessary limited to any particular size. Note: in other aspects, the training signal information may be distributed between intervals. For example, the framing pattern, training pattern, and channel ID may each be equally distributed between the 2 training signal wrappers in FIG. 2C. Alternately, the different non-predetermined information sections need not be distributed evenly. For example, the framing pattern (not shown) may be located in first training signal wrapper 208 in FIG. 2C, and the training pattern located in training wrapper section 210.

Returning to FIG. 1, a multi-channel ITU G.709 OTN receiver 116 is also depicted. The receiver 116 comprises an optical module 118 to accept the PM-QPSK signals on line 114, and to provide one pair of TE_OTN PF signals (e.g., signal paths 120a and 120b) as Ix and Qx electrical signal paths. Optical module 112 also provides another pair of TE_OTN PF signals (e.g., signal paths 120c and 120n) as Iy and Qy electrical signals.

A demultiplexing module (DEMUX) 122 has an input on line 120 (120a-120n) to accept n TE_OTN-PFs. In this example, n=4. The DEMUX 122 demultiplexes the n parallel streams in a TE OTN frame supplied at an output on line 124. The DEMUX 122 may demultiplex the n parallel streams into the TE OTN using either a bit or multi-bit orientation.

A training signal module (TSM) 126 accepts the TE OTN on line 124. The TSM 126 recovers a training signal wrapper from the TE OTN, which is supplied on line 128. The TSM supplies an ITU G.709 OTN frame including an OTU overhead (OH), an ODU section, and a forward error correction (FEC) parity section at an output on line 130.

The training signal module 126 accepts a TE OTN frame on line 124 at a rate of (X+T)n bits/second, where T is the number of bits in the training signal wrapper and X is the number of bits in the ITU G.709 OTN frame, and supplies the ITU G.709 OTN frame on line 130 at a rate of Xn bits/second. In one aspect, the training signal module 126 accepts a TE OTN frame at a rate of (X+T*j)n bits/second, where T is the number of bits in the training signal wrapper and j is 2, 4, or 8, and supplies the ITU G.709 OTN frame at a rate of Xn bits/second. However, j need not necessarily be limited to these values.

As noted above in the explanation of FIGS. 2A through 2D, the TSM 126 accepts TE OTN frames where the training signal wrapper has been added in an interval, such as once per ITU G.709 OTN frame, every ½ ITU G.709 OTN frame, every ¼ ITU G.709 OTN frame, or every ⅛ ITU G.709 OTN frame.

As explained above, the training signal wrapper may include framing information, tone information, channel identification information, or combinations of the above-mentioned information types. For example, the training signal wrapper may have a size in the range of 1 to 256 bytes for each TE OTN, with a framing pattern having a size in the range of 0 to 256 bytes, a training pattern having a size in the range of 0 to 256 bytes, and a channel ID having a size in the range of 0 to 256 bytes.

In some aspects, the receiver 116 includes an equalizer 132 to accept the training signal wrapper from the TSM 126 on line 128 and the ITU G.709 OTN frame on line 130. The equalizer 132 compares the training signal wrapper with a predetermined pattern to calculate a receiver correlation error, and adjusts the parameters of an equalization filter in response to the calculated correlation error. The equalizer 132 supplies a filtered ITU G.709 OTN frame at an output on line 136.

A training signal wrapper includes a long deterministic pattern, longer than any pattern available in a conventional ITU G.709 OTN frame. Typically, only the framing pattern is fully deterministic in an OTN frame. At the beginning of a message time, the receiver is not equalized. As a result, "0"s and "1"s are interpreted against a preset threshold. Using the preset threshold, the equalizer 132 attempts to find the predetermined pattern (in the training signal wrapper) that is repeated, frame after frame. Since inter-symbolic interference (ISI) typically exists, the interpretation of a bit depends on the bits that preceded it. However, a predetermined pattern of bits can be used to evaluate and correct the errors associated with ISI. Once the ISI, or correlation errors have been calculated based upon the known pattern, errors in non-predetermined data can be minimized. There are many different types of equalizers known in the art for correcting different parameter types.

An equalization (EQ) filter is usually adjustable, to compensate for the unequal frequency response of the channel, or some other signal processing circuit. An EQ filter permits one or more parameters to be adjusted that determine the overall shape of the filter's transfer function. Generally, equalizers operate on the parameters of frequency, Q (bandwidth), and gain. In digital communications, equalizers primarily provide an inverse of the channel impulse response.

In another aspect, the TSM 126 may compare the training signal wrapper with a predetermined pattern to correct for skew between the Ix, Qx, Iy, and Qy channels.

Functional Description

Figure 3:
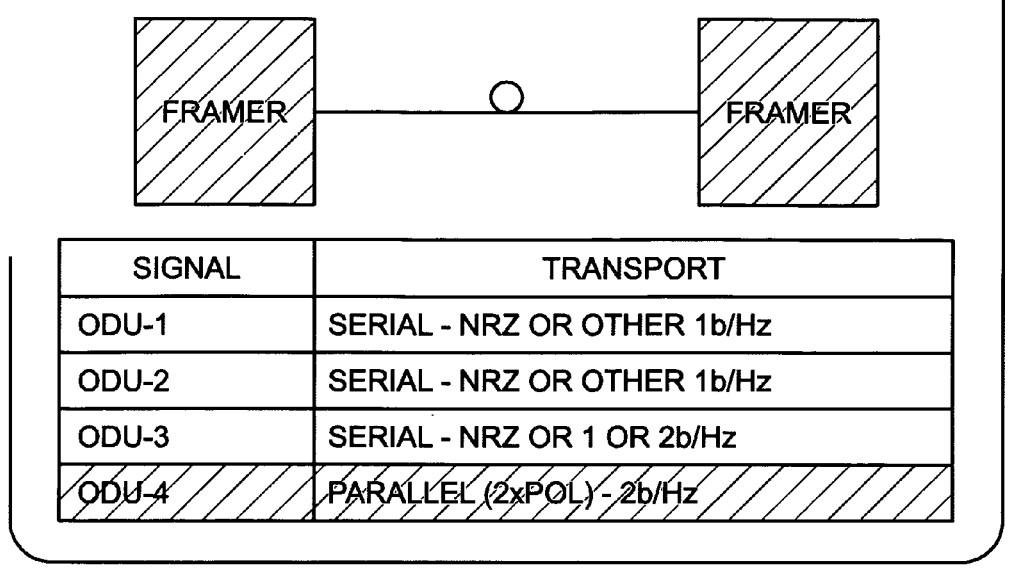
FIG. 3 is a diagram depicting basic Optical Transport system requirements.

FIG. 3 is a diagram depicting basic Optical Transport system requirements. ODU-1, ODU-2, and ODU-3 signals use a non-return-to-zero (NRZ) protocol at either 1 or 2 bits per Hertz. In contrast, the parallel frames of the ODU-4 signal are orthogonally polarized to operate at 2 bits per Hertz, per polarization channel.

Figure 4:
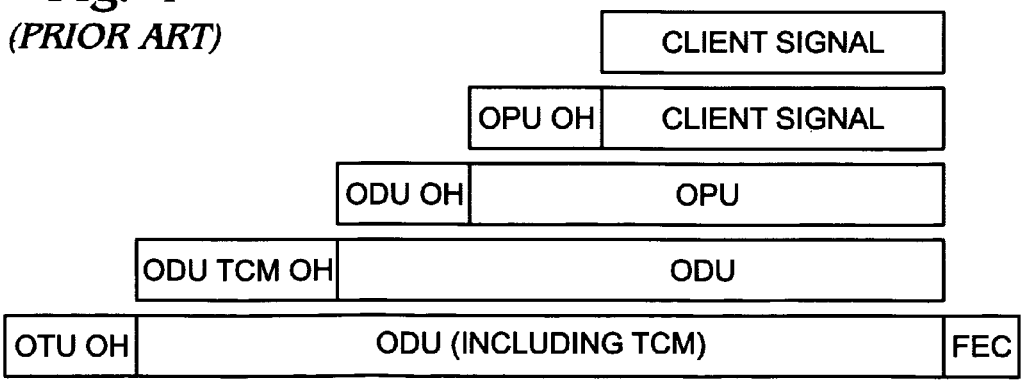
FIG. 4 is a diagram depicting the transportation of a client signal in an OTN network hierarchy (prior art).

FIG. 4 is a diagram depicting the transportation of a client signal in an OTN network hierarchy (prior art).

Figure 5:
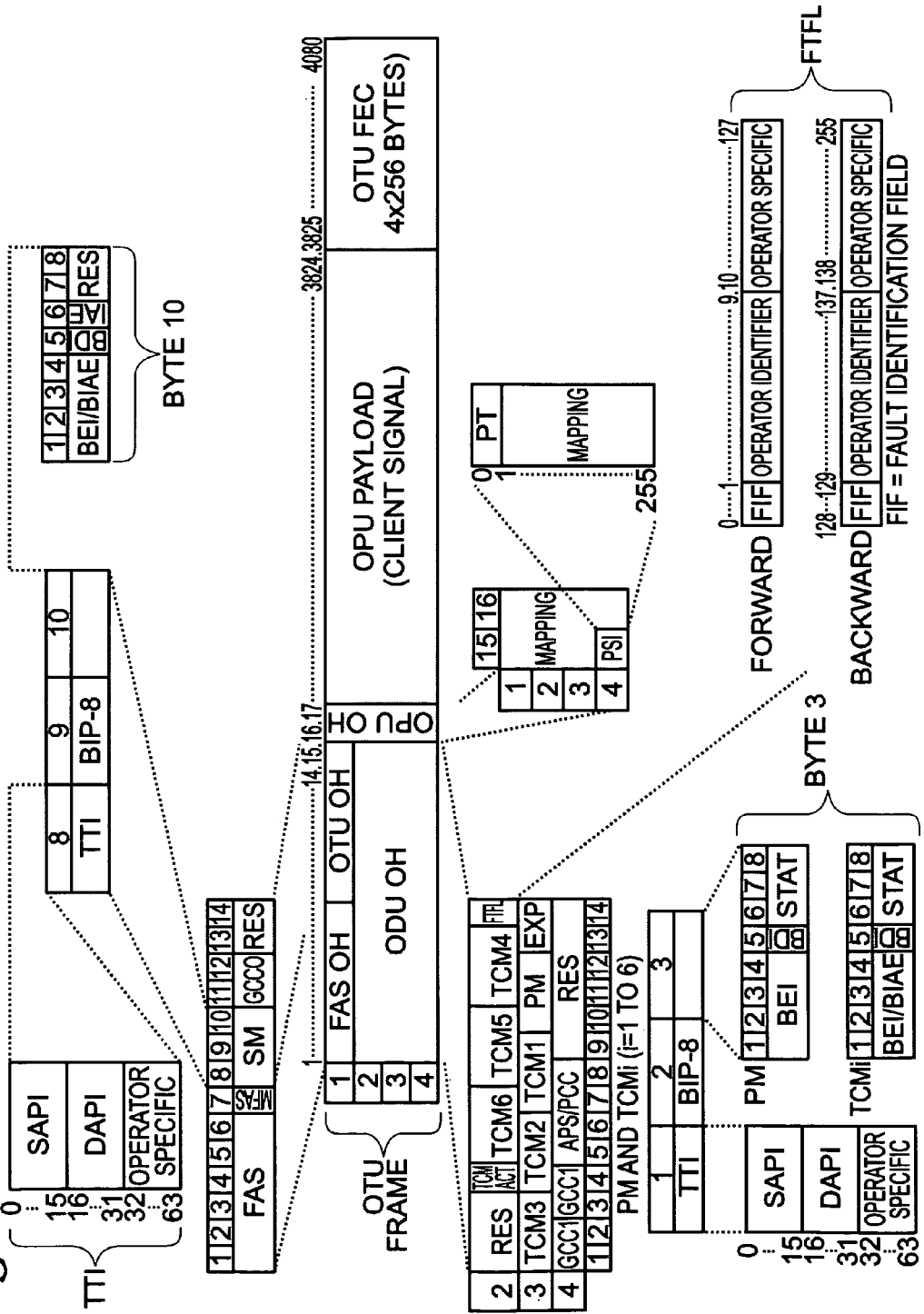
FIG. 5 is a diagram depicting the structure of an OTN frame and the utilization of bits/bytes for OH purposes (prior art).

FIG. 5 is a diagram depicting the structure of an OTN frame and the utilization of bits/bytes for OH purposes (prior art). Only the FAS (Frame Alignment Signal) portion of the frame is known a priori. There are other bits/bytes that may be deterministic, but that is only true if other information about the communication is known, or the previous value (in the previous frame) of the same byte was known. For example, the payload type does not change unless the MFAS is an incremental counter. More explicitly, out of 4080×4=16320 bytes, only 6 bytes are known a priori. The deterministic (FAS) repeats periodically at the beginning of each frame.

The FAS was defined as a predetermined pattern sufficiently long to prevent false frames in serial communications. However, in a parallel communication system such as the Dual Polarization systems proposed for the transport of 100 Gbps client signals, the currently defined FAS would be split between the two polarizations.

Figure 6:
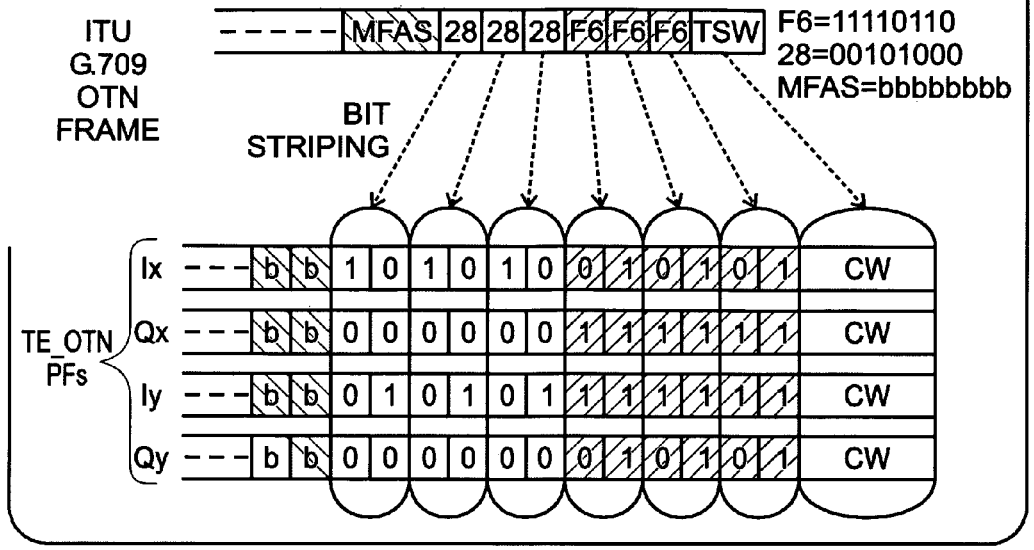
FIG. 6 is a diagram depicting OTN Frame BitMuxing in polarization multiplexed quadrature phase shift keying (PM-QPSK).

FIG. 6 is a diagram depicting OTN Frame BitMuxing in polarization multiplexed quadrature phase shift keying (PM-QPSK). In addition to being split between two polarizations, the FAS is split between i and q components inside each of the polarizations as shown. The relatively long pattern of 6 bytes in the conventional OTN frame (as shown—HEX: 28, 28, 28, F6, F6, and F6) is interleaved so that each parallel stream includes a 1.5-byte pattern. The present invention provides a longer pattern for each parallel stream than is provided by a conventional ITU G.709 OTN frame.

When receiving a PM-QPSK signal, a receiver block of a communication system must accomplish the following tasks in order to recover the data and clock from the incoming signal:

Recognize each bit. Bit recognition requires the receiver to be equalized to the channel. Most of equalization techniques are based on equalization training via known patterns;

Recognize the components of the signal on each of the two polarizations; and,

Align the components of the signals coming from each of the two polarizations.

However, the current definition of the OTN frame and OTN systems cannot be used to efficient communicate PM-QPSK signals at high speeds. In order to solve this problem, a longer training sequence is required.

As shown in FIGS. 2A-2D and 6, a training signal wrapper (TSW) can be added to an ITU G.709 OTN frame, creating a channel wrapper (CW) for each of the parallel communication channels. This method does not require any feedback channel and remains active at all times during the communication.

Figure 7:
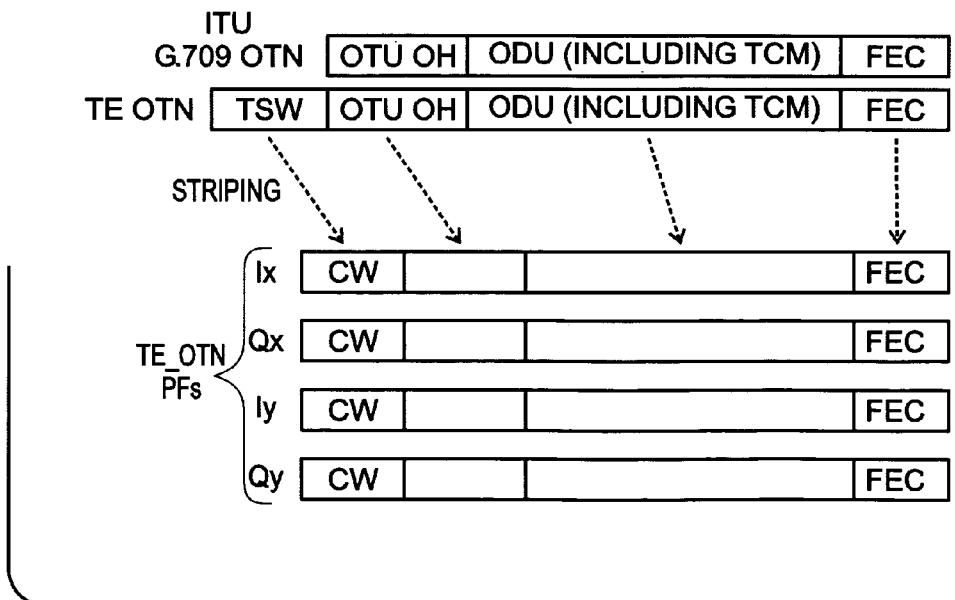
FIG. 7 is a diagram contrasting an ITU G.709 OTN frame, a TE OTN frame, and TE_OTN PFs.

FIG. 7 is a diagram contrasting an ITU G.709 OTN frame, a TE OTN frame, and TE_OTN PFs. As in FIG. 2D, the training signal wrapper (TSW) is added at an interval of once per ITU G.709 OTN frame. The TSM is interleaved across the four TE_OTN PFs, creating a channel wrapper (CW) for each parallel stream.

FIG. 8 is a flowchart illustrating a multi-channel ITU G.709 OTN transmission method. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 800.

Step 802 accepts an ITU G.709 OTN frame including an OTU OH section, an ODU section, and an FEC parity section. Step 804 adds a training signal wrapper to the ITU G.709 OTN frame. Step 806 buffers at least a portion of a TE OTN frame in a tangible memory medium in preparation for striping. Step 808 stripes the training-enhanced OTN frame into n parallel streams, in units of a bit or multi-bit, to supply n TE_OTN-PFs at an output.

In one aspect, accepting the ITU G.709 OTN frame in Step 802 includes accepting the ITU G.709 OTN frame at a rate of Xn bits/second, where X is the number of bits in the ITU G.709 OTN frame. Then, adding training signal wrapper to the ITU G.709 OTN frame in Step 804 includes supplying the TE OTN frame at a rate of (X+T)n bits/second, where T is the number of bits in the training signal wrapper. In another aspect, Step 804 supplies the TE OTN frame at a rate of (X+T*j)n bits/second, where T is the number of bits in the training signal wrapper and j is 2, 4, or 8.

In one aspect, Step 804 adds training signal wrapper to the ITU G.709 OTN frame in one of the following intervals: every ⅛ ITU G.709 OTN frame, every ¼ ITU G.709 OTN frame, every ½ ITU G.709 OTN frame, or once every ITU G.709 OTN frame.

In a different aspect, Step 804 supplies a training signal wrapper including information such as framing information, tone information, channel identification information, or combinations of the above-mentioned information types. For example, training signal wrapper may have a size in the range of 1 to 256 bytes for each TE OTN, with each training signal wrapper including a framing pattern with a size in the range of 0 to 256 bytes, a training pattern with a size in the range of 0 to 256 bytes, and a channel ID with a size in the range of 0 to 256 bytes.

FIG. 9 is a flowchart illustrating a multi-channel ITU G.709 OTN receiving method. The method starts at Step 900. Step 902 accepts n TE_OTN-PFs. Step 904 demultiplexes the n parallel streams in a TE OTN frame. Step 906 accepts the TE OTN frame. Step 908 recovers a training signal wrapper from the TE OTN. In a tangible memory medium, Step 910 buffers at least a portion of an ITU G.709 OTN frame including an OTU OH section, an ODU section, and an FEC parity section.

In one aspect, accepting the TE OTN frame in Step 906 includes accepting a TE OTN frame at a rate of (X+T)n bits/second, where T is the number of bits in the training signal wrapper and X is the number of bits in the ITU G.709 OTN frame. Then, buffering the ITU G.709 OTN frame in Step 910 includes supplying the ITU G.709 OTN frame at a rate of Xn bits/second. In another aspect, Step 906 accepts a TE OTN frame at a rate of (X+T*j)n bits/second, where T is the number of bits in the training signal wrapper and j is 2, 4, or 8, and Step 910 supplies the ITU G.709 OTN frame at a rate of Xn bits/second.

Step 910 supplies the ITU G.709 OTN frame at a rate of Xn bits/second, where X is the number of bits in the ITU G.709 OTN frame OTN frame.

In a different aspect, accepting the TE OTN frame in Step 906 includes accepting TE OTN frames where the training signal wrapper has been added in one of the following intervals: once per ITU G.709 OTN frame, every ½ ITU G.709 OTN frame, every ¼ ITU G.709 OTN frame, or every ⅛ ITU G.709 OTN frame.

In one aspect, recovering the training signal wrapper from the TE OTN in Step 908 includes recovering a training signal wrapper including information such as framing information, tone information, channel identification information, or combinations of the above-mentioned information types. For example, a training signal wrapper may be recovered with a size in the range of 1 to 256 bytes for each TE OTN, where each training signal wrapper includes a framing pattern with a size in the range of 0 to 256 bytes, a training pattern with a size in the range of 0 to 256 bytes, and a channel ID with a size in the range of 0 to 256 bytes.

In another aspect, Step 912 compares the training signal wrapper with a predetermined pattern. Step 914 determines a receiver correlation error. Step 916 adjusts an equalization filter in response to determining the receiver correlation error, and Step 918 supplies a filtered ITU G.709 OTN frame.

Systems and methods have been provided for communicating information in a multi-channel ITU G.709 optical transport network. Examples of specific training patterns and the placement of these patterns have been given to illustrate the invention. Likewise, the invention has been described in the context of an optical network. However, the invention is not necessarily limited to these examples. Other variations and embodiments of the invention will occur to those skilled in the art.

We claim:

1. A multi-channel ITU G.709 optical transport network (OTN) transmitter, the transmitter comprising:
   a training signal module (TSM) having an input to accept an ITU G.709 OTN frame electrical signal including an OTU overhead (OH) section, an ODU payload section, and a forward error correction (FEC) parity section, the training signal module creating a training-enhanced (TE) OTN frame by leaving the ITU G.709 frame intact and adding a training signal wrapper to the ITU G.709 OTN frame, and supplying the training-enhanced (TE) OTN frame electrical signal at an output;
   a striping module (SM) having an input to accept the training enhanced OTN frame, the SM striping the training-enhanced OTN frame into n parallel streams to supply n TE_OTN-PFs (Parallel Frames) over an optical channel using Polarization Multiplexed n-Phase Shift Keying (PM-nPSK) modulation, where the training signal wrapper is interleaved across the n TE_OTN-PFs to create a channel wrapper that is added to each parallel TE_OTN-PF stream;
   wherein the training signal module accepts the ITU G.709 OTN frame at a rate of Xn bits/second, where X is the number of bits in the ITU G.709 OTN frame OTN frame; and,
   wherein the TSM supplies a TE OTN frame at a rate of (X+T*j)n bits/second, where T is the number of bits in the training signal wrapper and j is selected from a group consisting of 2, 4, and 8.

2. The transmitter of claim 1 wherein the training signal module accepts the ITU G.709 OTN frame at a rate of Xn bits/second, where X is the number of bits in the ITU G.709 OTN frame; and,
   wherein the TSM supplies a TE OTN frame at a rate of (X+T)n bits/second, where T is the number of bits in the training signal wrapper.

3. The transmitter of claim 1 wherein the TSM adds a training signal wrapper to supply TE OTN frames in an interval selected from a group consisting of every ⅛ ITU G.709 OTN frame, every ¼ ITU G.709 OTN frame, every ½ ITU G.709 OTN frame, and once every ITU G.709 OTN frame.

4. The transmitter of claim 1 wherein the training signal module supplies a training signal wrapper including information selected from a group consisting of framing information, tone information, channel identification information, and combinations of the above-mentioned information types.

5. The transmitter of claim 4 wherein the training signal module adds a training signal wrapper with a size in a range of 1 to 256 bytes for each TE OTN, with each training signal wrapper including a framing pattern with a size in a range of 0 to 256 bytes, a training pattern with a size in a range of 0 to 256 bytes, and a channel ID with a size inn a range of 0 to 256 bytes.

6. The transmitter of claim 1 wherein the SM stripes the TE OTN into n parallel streams using an orientation selected from a group consisting of a bit and a multi-bit.

7. A multi-channel ITU G.709 optical transport network (OTN) transmission method, the method comprising:
   accepting an ITU G.709 OTN frame electrical signal at a rate of Xn bits/second, where X is the number of bits in the ITU G.709 OTN frame, the ITU G.709 frame including an OTU overhead (OH) section, an ODU section, and a forward error correction (FEC) parity section;
   leaving the ITU G.709 OTN frame intact, adding a training signal wrapper to the ITU G.709 OTN frame, and supplying a training-enhanced (TE) OTN frame at a rate of (X+T*j)n bits/second, where T is the number of bits in the training signal wrapper and j is selected from a group consisting of 2, 4, and 8.
   in a tangible memory medium, buffering at least a portion of the TE OTN frame in preparation for striping; and,
   striping the training-enhanced OTN frame into n parallel streams to supply n TE_OTN-PFs (Parallel Frames) over an optical channel using Polarization Multiplexed n-Phase Shift Keying (PM-nPSK) modulation, where the training signal wrapper is interleaved across the n TE_OTN-PFs to create a channel wrapper that is added to each parallel TE_OTN-PF stream.

8. The method of claim 7 wherein accepting the ITU G.709 OTN frame includes accepting the ITU G.709 OTN frame at a rate of Xn bits/second, where X is the number of bits in the ITU G.709 OTN frame; and,
   wherein adding training signal wrapper to the ITU G.709 OTN frame includes supplying the TE OTN frame at a rate of (X+T)n bits/second, where T is the number of bits in the training signal wrapper.

9. The method of claim 7 wherein adding training signal wrapper to the ITU G.709 OTN frame includes supplying TE OTN frames in an interval selected from a group consisting of every ⅛ ITU G.709 OTN frame, every ¼ ITU G.709 OTN frame, every ½ ITU G.709 OTN frame, and once every ITU G.709 OTN frame.

10. The method of claim 7 wherein adding training signal wrapper to the ITU G.709 OTN frame includes supplying a training signal wrapper including information selected from a group consisting of framing information, tone information, channel identification information, and combinations of the above-mentioned information types.

11. The method of claim 10 wherein adding training signal wrapper to the ITU G.709 OTN frame includes adding a training signal wrapper with a size in a range of 1 to 256 bytes for each TE OTN, with each training signal wrapper including a framing pattern with a size in a range of 0 to 256 bytes, a training pattern with a size in a range of 0 to 256 bytes, and a channel ID with a size in a range of 0 to 256 bytes.

12. The method of claim 7 wherein striping the TE OTN frame includes striping the TE OTN into n parallel streams using an orientation selected from a group consisting of a bit and a multi-bit.

13. A multi-channel ITU G.709 optical transport network (OTN) receiver, the receiver comprising:
   a demultiplexing module (DEMUX) having an input to accept n Polarization Multiplexed n-Phase Shift Keying (PM-nPSK) modulated training-enhanced (TE)_OTN-PFs (Parallel Frames) via an optical channel, where each TE_OTN-PF includes a channel wrapper, the DEMUX demultiplexing the n parallel streams into an ITU G.709 OTN frame electrical signal, including an OTU overhead (OH) section, an ODU section, and a forward error correction (FEC) parity section, and demultiplexing the n channel wrappers into a training signal wrapper, the DEMUX creating a TE OTN frame by leaving the ITU G.709 OTN frame intact and adding the training signal wrapper to the ITU G.709 OTN frame; and,
   a training signal module (TSM) having an input to accept the TE OTN frame from the DEMUX at a rate of (X+T*j)n bits/second, where T is the number of bits in the training signal wrapper and j is selected from a group consisting of 2, 4, and 8, the TSM recovering the training signal wrapper from the TE OTN and the ITU G.709 OTN frame, and supplying the ITU G.709 OTN frame at an output at a rate of Xn bits/second, where X is the number of bits in the ITU G.709 OTN frame OTN frame.

14. The receiver of claim 13 wherein the training signal module accepts a TE OTN frame at a rate of (X+T)n bits/second, where T is the number of bits in the training signal wrapper and X is the number of bits in the ITU G.709 OTN frame, and supplies the ITU G.709 OTN frame at a rate of Xn bits/second.

15. The receiver of claim 13 wherein the TSM accepts TE OTN frames where the training signal wrapper has been added in an interval selected from the group of once per ITU G.709 OTN frame, every ½ ITU G.709 OTN frame, every ¼ ITU G.709 OTN frame, and every ⅛ ITU G.709 OTN frame.

16. The receiver of claim 13 wherein the training signal module recovers a training signal wrapper including information selected from a group consisting of framing information, tone information, channel identification information, and combinations of the above-mentioned information types.

17. The receiver of claim 16 wherein the training signal module recovers a training signal wrapper with a size in a range of 1 to 256 bytes for each TE OTN, each training signal wrapper including a framing pattern with a size in a range of 0 to 256 bytes, a training pattern with a size in a range of 0 to 256 bytes, and a channel ID with a size in a range of 0 to 256 bytes.

18. The receiver of claim 13 wherein the DEMUX demultiplexes the n parallel streams into the TE OTN using an orientation selected from a group consisting of a bit and a multi-bit.

19. The receiver of claim 13 further comprising:
   an equalizer having an input to accept the training signal wrapper and the ITU G.709 OTN frame from the TSM, the equalizer comparing the training signal wrapper with a predetermined pattern to calculate a receiver correlation error, adjusting parameters of an equalization filter in response to the calculated correlation error, and supplying a filtered ITU G-.709 OTN frame at an output.

20. A multi-channel ITU G.709 optical transport network (OTN) receiving method, the method comprising:
   accepting n Polarization Multiplexed n-Phase Shift Keying (PM-nPSK) modulated training-enhanced (TE)_OTN- PFs (Parallel Frames) via an optical channel, where each TE_OTN-PF includes a channel wrapper;

demultiplexing the n parallel streams into an ITU G.709 OTN frame electrical signal, including an OTU overhead (OH) section, an ODU section, and a forward error correction (FEC) parity section;

demultiplexing the n channel wrappers into a training signal wrapper;

creating a TE OTN frame at a rate of $(X+T*j)n$ bits/second, where T is the number of bits in the training signal wrapper and j is selected from a group consisting of 2, 4, and 8, by leaving the ITU G.709 OTN frame intact and adding the training signal wrapper; and, recovering the training signal wrapper from the TE OTN; and, in a tangible memory medium, buffering at least a portion of the ITU G.709 OTN frame, and supplying the ITU G.709 OTN frame at a rate of Xn bits/second, where X is the number of bits in the ITU G.709 OTN frame OTN frame.

21. The method of claim 20 wherein creating the TE OTN frame includes creating a TE OTN frame at a rate of $(X+T)n$ bits/second, where T is the number of bits in the training signal wrapper and X is the number of bits in the ITU G.709 OTN frame; and, wherein buffering the ITU G.709 OTN frame includes supplying the ITU G.709 OTN frame at a rate of Xn bits/second.

22. The method of claim 20 wherein creating the TE OTN frame includes creating TE OTN frames where the training signal wrapper has been added in an interval selected from a group consisting of once per ITU G.709 OTN frame, every ½ ITU G.709 OTN frame, every ¼ ITU G.709 OTN frame, and every its ⅛ ITU G.709 OTN frame.

23. The method of claim 20 wherein recovering the training signal wrapper from the TE OTN includes recovering a training signal wrapper including information selected from a group consisting of framing information, tone information, channel identification information, and combinations of the above-mentioned information types.

24. The method of claim 23 wherein recovering the training signal wrapper from the TE OTN includes recovering a training signal wrapper with a size in a range of 1 to 256 bytes for each TE OTN, each training signal wrapper including a framing pattern with a size in a range of 0 to 256 bytes, a training pattern with a size in a range of 0 to 256 bytes, and a channel ID with a size in a range of 0 to 256 bytes.

25. The method of claim 20 wherein demultiplexing the n parallel streams includes demultiplexing the n parallel streams into the TE OTN using an orientation selected from a group consisting of a bit and a multi-bit.

26. The method of claim 20 further comprising:
comparing the training signal wrapper with a predetermined pattern;
determining a receiver correlation error;
adjusting an equalization filter in response to determining the receiver correlation error; and,
supplying a filtered ITU G.709 OTN frame.

* * * * *